(12) United States Patent
Tervo et al.

(10) Patent No.: US 7,200,384 B1
(45) Date of Patent: Apr. 3, 2007

(54) METHOD FOR STORING AND INFORMING PROPERTIES OF A WIRELESS COMMUNICATION DEVICE

(75) Inventors: Vesa Tervo, Tampere (FI); Satu Mäkelä, Tampere (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/560,380

(22) Filed: Apr. 28, 2000

(30) Foreign Application Priority Data

Apr. 30, 1999 (FI) .................................. 991000

(51) Int. Cl.
*H04Q 7/20* (2006.01)

(52) U.S. Cl. ............... 455/414.1; 455/433; 455/412.1; 455/422.1

(58) Field of Classification Search ......... 455/433, 455/410, 435, 422, 439, 560, 432, 561, 432.2, 455/517, 462, 411, 412.2, 412.1, 414.1, 414.4, 455/422.1, 435.1, 446, 507, 511, 432.1
See application file for complete search history.

(56) References Cited

U.S. PATENT DOCUMENTS

| 5,765,105 | A | * | 6/1998 | Kuriki | 455/410 |
|---|---|---|---|---|---|
| 5,940,589 | A | * | 8/1999 | Donovan et al. | 713/200 |
| 6,032,044 | A | * | 2/2000 | Shannon et al. | 455/433 |
| 6,091,952 | A | * | 7/2000 | Xu | 455/433 |
| 6,091,953 | A | * | 7/2000 | Ho | 455/433 |
| 6,119,000 | A | * | 9/2000 | Stephenson et al. | 455/432.1 |
| 6,188,898 | B1 | * | 2/2001 | Phillips | 455/433 |
| 6,311,055 | B1 | * | 10/2001 | Boltz | 455/414 |
| 6,351,648 | B1 | * | 2/2002 | Karapetkov et al. | 455/466 |
| 6,374,112 | B1 | * | 4/2002 | Widegren et al. | 455/453 |
| 6,556,820 | B1 | * | 4/2003 | Le et al. | 455/411 |
| 6,618,595 | B1 | * | 9/2003 | Baumeister et al. | 455/517 |

* cited by examiner

*Primary Examiner*—Edward F. Urban
*Assistant Examiner*—John J. Lee
(74) *Attorney, Agent, or Firm*—Perman & Green, LLP

(57) ABSTRACT

The invention relates to a method for storing and informing at least one property of a wireless communication device (MS1–MS4) to a mobile communication network (PLMN). Parameter data of said at least one property of said wireless communication device (MS1–MS4) is stored in said wireless communication device (MS1–MS4), and transmitted from said wireless communication device (MS1–MS4) to the mobile communication network (PLMN).

81 Claims, 4 Drawing Sheets

METHOD FOR STORING AND INFORMING PROPERTIES OF A WIRELESS COMMUNICATION DEVICE

BACKGROUND OF THE INVENTION

The present invention relates to a method for storing and informing at least one property of a wireless communication device to a mobile communication network. The present invention also relates to a wireless communication device comprising means for informing at least one property of said wireless communication device to a mobile communication network, and to a wireless communication system comprising at least a mobile communication network, a wireless communication device, and means for informing at least one property of said wireless communication device to said mobile communication network.

The number of wireless communication devices, such as mobile terminals and particularly personal portable mobile phones in use has constantly increased. These devices operate in a modern public land mobile network (PLMN) based on a cellular network, such as the standardised GSM system (Global System for Mobile Communications) as well as the GSM 1800 and PCS 1900 systems. Also, network operators constantly endeavour to develop their services offered to users of wireless communication devices. Such a service is e.g. the provision of data transmission connections to services of not only a public switched telephone network (PSTN) but also a general packet data network (PDN) and an integrated services digital network (ISDN). By using these data transmission connections, e.g. providers of services in the Internet network can develop their services to users of wireless communication devices, such as mobile phones and portable personal computers (PC) that can be coupled to them e.g. by means of PCMCIA cards.

The increased use of multimedia applications sets demands on not only the PSTN network but also particularly on systems of mobile communication networks, such as the PLMN network. Thus, the systems must be applicable to the transmission of not only text and data but also graphics, audio and moving images. Applications include video conferencing, real-time transmission of video images in connection with medical examinations, transmission of high-resolution images, communication in e.g. company intranet networks, interactive games, and transmission of music. These applications are particularly characterised by their demand for a connection with a sufficiently high speed data communication capacity between the communication devices in the communication network, and by the fact that the data transmission is often conducted in short sequences.

For example in the present GSM system, data transmission between communication devices, such as a mobile station and a base transceiver station, on one logical radio channel is conducted at the rate of 9.6 kbit/s. A high speed circuit switched data (HSCSD) service has also been developed for the GSM system, where the data transmission capacity is as high as 64 kbit/s. Thus, this service uses all the eight logical radio channels of the physical radio channel for data transmission between the mobile station and the base transceiver station. In this way, the user of the mobile station can be offered digital services to an ISDN network and the communication devices of its service providers at a rate of 64 kbit/s. Another system based on the GSM system is the general packet radio service (GPRS) system. This system improves the efficiency of communication, because the same logical radio channel can be used by several different mobile subscribers. For example, data transmission between a mobile station and a base transceiver station takes place only when necessary, and the logical radio channel is not reserved for communication between only one mobile station and base transceiver station. There is a so-called virtual data transmission connection between the mobile station and the GPRS system. The data transmission capacity of the current GPRS system on one logical radio channel is as high as 21 kbit/s, and as high as 171 kbit/s when all the logical radio channels are used. Future systems supporting wireless multimedia include the wide-band UMTS system (Universal Mobile Telecommunications System) aiming at high speed which can achieve instantaneous data rates as high as several megabits/s.

In third-generation systems, the concepts of a bearer service and a service are introduced. A bearer service generally corresponds to the older concept of a traffic channel, defining for example the data rate and quality of service (QoS) that will be provided by the system for transferring information between a mobile station and some other part of the system. For example, a bearer service between the mobile station and a base station is a radio bearer service, and a bearer service between a radio network controller and a core network is an Iu bearer service (Interface UMTS bearer). The interface between a radio network controller and a core network is called the Iu interface. A service, on the other hand, is provided by a mobile communication system to fulfil a specific task, e.g. data services carry out data transfer in the communication system, call services are associated with phone calls, multimedia, etc. A major task for the operation of a third-generation mobile communications system is to manage (set up, maintain and terminate, as necessary) the bearer services so that each requested service can be provided to the mobile stations without wasting the available bandwidth.

The quality of service level defines, for instance, how packet data units (PDU) are processed in a GPRS network during transmission. For example, the quality of service levels defined for the connection addresses are used to control the order of transmission, buffering (packet queues) and discarding of packets in the support node and in the gateway support node, especially when there are two or more connections which have packets to be transmitted simultaneously. Different quality of service levels define different delays for packet transmissions between different ends of the connection, different bit rates and the number of discarded packet data units.

Also in e.g. circuit switched networks, such as high speed circuit switched networks, it is possible to define several quality of service levels for each connection. Different quality of service levels can be achieved e.g. by reserving a different number of logical channels for a connection.

For each connection (connection address), it is possible to request a different quality of service level. For example in e-mail connections, a relatively long delay can be allowed in the message transmission. However, interactive applications, for example, require high-speed packet transmission. In some applications, as in file transfer, it is important that the packet transmission is error free, wherein packet data units are re-transmitted in error situations, if necessary.

For using multimedia services, a communication device, such as a wireless communication device, sets up a data transmission connection with a PLMN network and the server of a communication device of this network providing the multimedia services. Such a service may be a message service, such as a short message transmission service (SMS) or a paging service. The destination communication device with which communication is established and its server may also be located in another PLMN network.

Not all the communication devices of a communication network, such as the mobile stations connected with a PLMN network, have the capabilities to support e.g. video calls, faster data transmission connections or data transmission in packet form. However, it must also be possible to use devices of older generations and/or devices with limited options in a communication network supporting communication devices with more varied options. Consequently, the network should be able to connect conventional mobile phones which, in addition to transmission of speech, support only data transmission in text form, such as SMS messages, and wireless communication devices with which it is possible to use e.g. services of the Internet network. One current example of a wireless communication device with extended capabilities is the Nokia 9110 Communicator, in which the properties of a cellular mobile telephone (CMT) and a personal digital assistant (PDA) are combined. Hereafter in this text, this device and future developments thereof will be referred to using the term Communicator. In the future it is also likely that wireless communication devices will be adapted for the use of multimedia, i.e. there will be multimedia communication devices, suitable for the reception of graphics, audio and moving images. Communication devices that can be connected to the PSTN network are also being developed to include for example telephones that transmit calls via the Internet network, or which also transmit video images.

One problem in prior art systems is that the mobile communication network is not aware of all the properties of the communication devices it is intended to connect. Therefore the mobile communication network may try to connect a call to a receiving communication device even if that device cannot handle the call properly. For example, the call might be a data call with a desired data rate of 14400 bit/s, but the receiving communication device is only able to send and receive at 9600 bit/s.

Another problem with prior art systems is that the communication devices of service providers in a communication network do not know all the properties of the receiving communication device, which affect data transmission and the presentation of information. Thus, for example a server offering multimedia services may transmit information to a mobile station, a Communicator or a wireless multimedia communication device in a form that is not compatible with the device, or the information cannot be received at all. Thus, for example, the resolution of the graphics to be transmitted may be too high for the re-production capacity of the display of the receiving device; the moving video image or image information to be transmitted may be coded in a form that is not recognised by the receiving device; or the interactive application contains e.g. a form to be filled in but entering data is not possible with the receiving device, or it requires a pointing device to fill the form but the receiving device is not equipped with a pointing device. However, if data transmission is conducted in spite of the above-mentioned problems of prior art, this will result in a waste of capacity available in the communication network. The problems of the receiving device, due to incompatibility, will lead to failure situations or delays in the network, which may load or hamper other communication in the network. If the multimedia service is available only in a receiving communication device with certain options, this will have the result that either the user of the device will not receive the desired services, the device must be replaced with a suitable one, or several devices must be acquired for using different services.

It is known to connect a mobile phone or a radio card to a personal computer. This enables the personal computer to communicate with e.g. another personal computer, a server, or a communication device, such as a mobile phone or a Communicator. Furthermore, the personal computer may or may not include some peripheral devices, such as a pointing device, a high resolution display, a sound card, etc. The storage capacity (hard disk, random access memory, etc.) of the personal computer may also vary.

In order to function correctly, multimedia applications which include real time video, require the processor of the wireless communication device and/or the personal computer to operate at high speed. If a user attempts to use such an application, there should be means to check if the personal computer and the communication device connected to it are capable of fulfilling the performance requirements of the application. In prior art systems, a great deal of signalling is required between the personal computer and the server in which the application is stored to check if it is possible to execute the application.

In a prior art system, the user of the personal computer first establishes a call via the communication device to communicate with the server in which the application is stored. When the call is set up, the personal computer and the server negotiate concerning the properties of the personal computer, the communication device, and the requirements of the application. As a result of this negotiation process, the application is started, if the properties of the personal computer and the communication device fulfil the requirements. Otherwise, the call is advantageously terminated. It is also possible that such negotiation cannot be performed and the connection may not be properly carried out. Useless transmission of irrelevant information may also overload the communication network.

SUMMARY OF THE INVENTION

The purpose of the present invention is to reduce the drawbacks of prior art and to achieve a considerable improvement in data transmission between communication devices in a communication network. More precisely, the method of the invention is characterised in that parameter data representing at least one property of said wireless communication device is stored in said wireless communication device, and transmitted from said wireless communication device to the mobile communication network. These device properties can actually be physical or functional and may also include e.g. preferences for the use of communication resources. The wireless communication device of the invention is characterised in that it further comprises:

means for storing parameter data representing said at least one property of the wireless communication device, and means for transmitting the parameter data from the wireless communication device to said mobile communication network.

The wireless communication system of the invention is characterised in that the system further comprises:

means for storing parameter data representing said at least one property of the wireless communication device in the wireless communication device, and means for transmitting the parameter data from the wireless communication device to said mobile communication network.

An important principle of the invention is that information about the properties of the wireless communication device is transmitted to the mobile communication network which utilizes the information when, for example, registration is requested to the mobile communication network. The information could also be used at other times. Therefore the mobile communication network can optimize the services and filter out impossible connections. Further, information is transmitted e.g. from a server offering multimedia services to the receiving communication device, such as a mobile phone, Communicator or multimedia communication device, only in a form in which the receiving communication device can utilise it. For this purpose, the method of the invention is created e.g. for transmitting parameter data describing the properties of a communication device to the mobile communications network. The parameter data is advantageously stored within the International Mobile Station Equipment Identity of the wireless communication device. In the following, the invention will be described in more detail by using several examples for implementing the method in a communication network.

The invention gives several considerable advantages related to the operation of the communication network, such as a PLMN network, as well as advantages obtained by the mobile subscriber. The most important advantage is that by using the method of the invention, it is possible to improve the efficiency of data transmission between communication devices so that the properties of the receiving device, such as a wireless multimedia communication device, are taken into account in data transmission more comprehensively than in prior art. Thus, the capacity of the communication network is not wasted unnecessarily, whereby the data transmission is optimised according to the requirements of each subscriber. The signalling between the communication device and the communication network during call set-up is not substantially affected by the method of the invention, which also reduces the amount of communication needed to set up a connection when compared to prior art solutions where communication devices negotiate at the beginning of a call to determine the best possible format for communication. The invention also enables the communication network to support devices with different options and levels of sophistication, thus prolonging the useful lifetime of communication devices and improving the possibilities for their use. Moreover, the problems of incompatibility of devices in the communication network are reduced, and error situations and delays which may load the communication network are reduced with respect to prior art. Furthermore, according to an advantageous embodiment of the invention, the device property information is stored temporarily in the mobile communication network wherein memory usage in the network is more efficient and large permanent data stores containing device property information are not required.

BRIEF DESCRIPTION OF THE DRAWINGS

In the following, the invention will be described in more detail with reference to the appended drawings, in which.

DETAILED DESCRIPTION OF THE INVENTION

Figure 1:
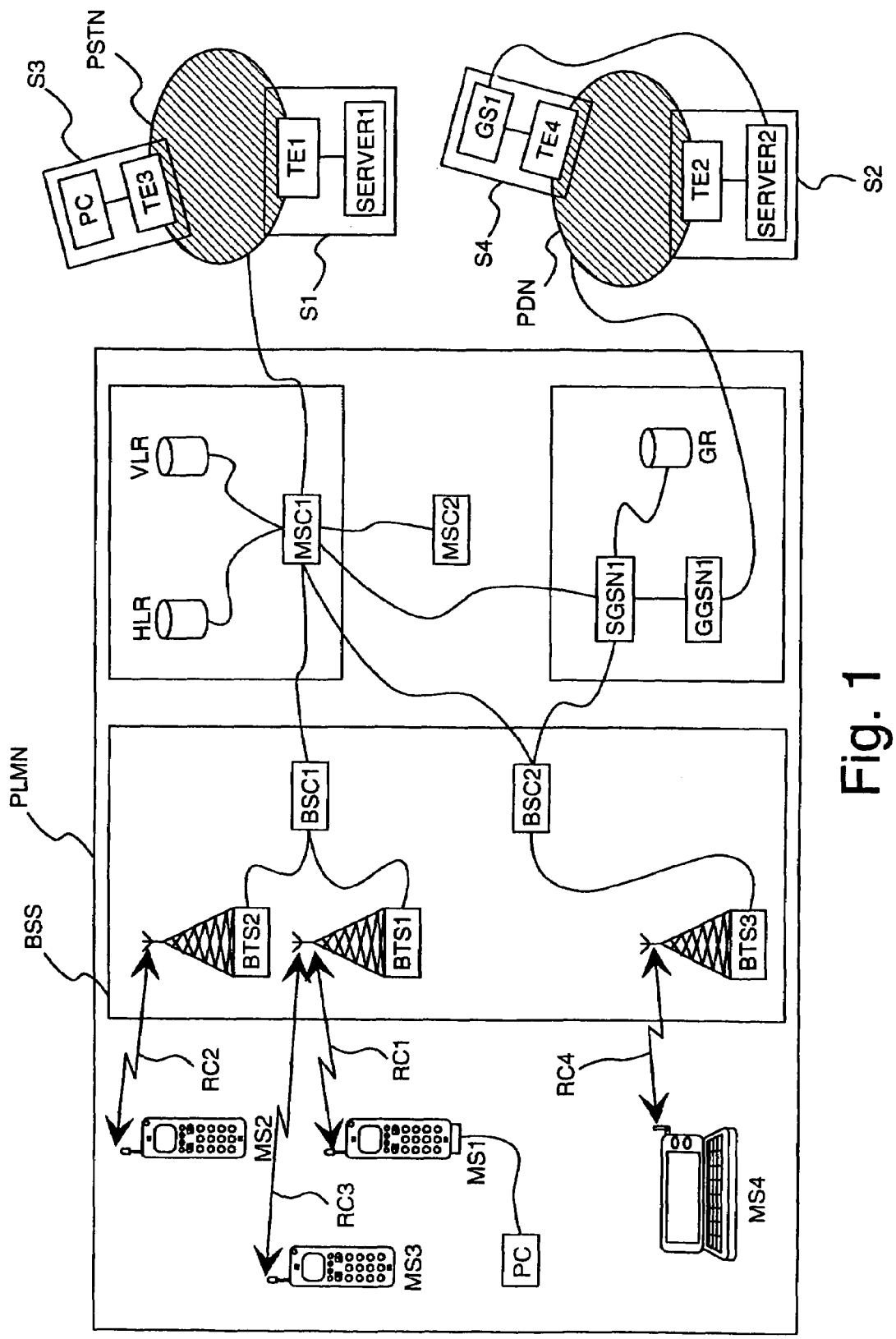
FIG. 1 is a schematic view showing a general mobile communication network based on a cellular network, FIG. 2 desrcibes an International Mobile Station Equipment Identity according to the prior art.

As shown in FIG. 1, the public land mobile network (PLMN) based on a cellular network, such as the GSM system, comprises, in a known manner, several communication devices, such as wireless communication devices (MS) MS1–MS4 and a base station subsystem BSS. This base station subsystem BSS usually comprises several base transceiver stations (BTS) BTS1, BTS2, BTS3 which are distributed within a geographical area and each base transceiver station serves a cell comprising at least part of this geographical area. Communication, such as transmission and reception of speech and data, between a wireless communication device MS1 located in the area of the cell served by the base transceiver station BTS1, and the base transceiver station BTS1 takes place via radio communication RC1 using radio channels reserved for the cell. The operation of the base transceiver stations BTS1 and BTS2 is controlled by a base station controller (BSC) BSC1 belonging to the base station subsystem BSS and serving the purpose of controlling the use of radio channels and controlling channel changes. The base station controller BSC1 communicates with a mobile services switching centre (MSC) MSC1 which serves the purpose of transmitting connections between the base transceiver stations BTS1–BTS3 coupled therewith, to other mobile services switching centres, such as MSC2, a public switched telephone network PSTN, and further via the PSTN network to its communication devices, such as a communication device S1 or S3. The communication device S1 comprises for example a telecommunication terminal, such as a modem TE1, and a data processor, such as a computer used as a server SERVER1. It is also possible that the communication device S1 or the data processor comprises means for video telephony, e.g. a camera and a display. The communication device S3 comprises for example a modem TE3, and a personal computer PC used as a data processing device. The communication devices of the PSTN network usually have their own telephone number, and in the data transmission connection set up, data transmission in the PSTN network takes place e.g. by means of phase shift keying (PSK) modulation or dual tone multi-frequency (DTMF) control of modems. In the communication device S1, data transmission and applications, such as the communication software, are controlled by the control software of the communication device S1, whereby this control software can be used for transmitting data e.g. between the modem TE1 and the computer used as a server SERVER1. To illustrate the invention, FIG. 1 shows only the wireless communication devices MS1–MS4 and the base transceiver stations BTS1–BTS3, but in a known manner, the system usually comprises a large number of wireless communication devices as well as base transceiver stations serving the same. The system usually also comprises more than two mobile services switching centres MSC1 and MSC2. Moreover, a PSTN network comprises several communication devices that can be coupled with it via different telephone operators.

Furthermore, with reference to FIG. 1, the mobile services switching centre MSC1 maintains information on the location of the wireless communication devices MS1–MS4 in the area of cells served by the base transceiver stations BTS1–BTS3 by means of a home location register HLR and a visitor location register VLR. These registers HLR and VLR contain for instance the telephone number and the international mobile subscriber identification (IMSI) of the wireless communication device. The home location register HLR contains information on wireless communication devices registered in the mobile services switching centre MSC1 and their locations. The visitor location register VLR contains information on the wireless communication devices which are temporarily registered in the mobile services switching centre MSC1. Different mobile services switching centres exchange this information for maintaining data transmission in a mobile communication network.

Figure 2:
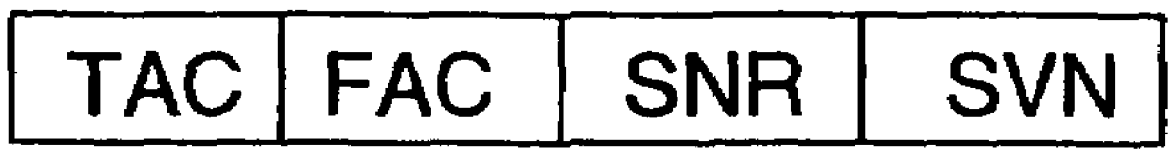

In addition, the wireless communication device MS1–MS4 comprises a device identifier, e.g. International Mobile Station Equipment Identity (IMEI). This identifier is stored in the wireless communication device so that it cannot be altered by the user of the wireless communication device. The IMEI contains information about the device, e.g. a Type Approval Code (TAC), a Final Assembly Code (FAC), a Serial Number (SNR), and a Software Version Number (SVR). FIG. 2 presents an example of the International Mobile Station Equipment Identity IMEI of prior art as defined in the European Telecommunication Standards Institute standard GSM 02.16 "Digital cellular telecommunications system; International Mobile station Equipment Identities (IMEI)" (November 1996). The mobile communication network can perform an IMEI check at any time e.g. to prevent access to the network from illegal devices, stolen devices, etc.

The mobile services switching centre MSC1 can perform an IMEI check to find out whether the wireless communication device MS1 is permitted for use. The European Telecommunication Standards Institute standard GSM 02.16, sections 4 "Use of the equipment identity register" and 5 "Procedure" (November 1996) provide information about the IMEI check in the GSM. In the mobile communication network PLMN there is advantageously provided an equipment identity register (not shown), which comprises a white list which is composed of number series of device identities that are permitted for use, a black list which is composed of number series of device identities that should be barred, and possibly a grey list which is composed of number series of device identities that need not be barred but are tracked by the mobile communication network PLMN. Advantageously during the IMEI check, the mobile services switching centre MSC1 compares the Type Approval Code, the Final Assembly Code, and the Serial Number of the IMEI with number series of the device identities in the white list, in the black list and possibly in the grey list to accept or deny the authentication request of the wireless communcation device MS1.

With reference to FIG. 1, if the public land mobile network PLMN based on a cellular network and its communication devices, such as wireless communication devices MS1–MS4, are compatible with the GSM system, the network can also comprise at least one serving GPRS support node SGSN, communicating with a base station controller, such as the base station controller BSC2, as well as a gateway GPRS support node GGSN communicating with the same. The gateway GPRS support node GGSN is the support node with which the general packet data network PDN communicates. Communication devices in this PDN network, such as the communication device S2, comprise a telecommunication terminal TE2, and a data processor, such as a computer used as a server SERVER2. The gateway GPRS support node GGSN contains information for addressing the protocol data units (PDU) entering from the PDN network to the serving GPRS support node SGSN with which the communication device, such as wireless communication device MS4, communicates. These data packets comply with the protocol definition of the data transmission connection, such as the Internet protocol (IP), X.25 or CLNP, and they also contain the address of the destination communication device. The serving GPRS support node SGSN and the gateway GPRS support node GGSN can support several protocol definitions for connections of a landline network PDN, and they are usually selected by the network operator. The gateway GPRS support node GGSN and the serving GPRS support node SGSN can also be located together in the same device. There is a register GR, e.g. in the SGSN, which contains information about wireless communication devices registered in the gateway GPRS support node GGSN, such as their IMSI identifications and addresses for addressing the PDU data packets in the network. Usually, the serving GPRS support node SGSN also communicates with the mobile services switching centre, such as the mobile services switching centre MSC1 according to FIG. 1, in order to enable data exchange. The mobile services switching centre MSC1 transmits e.g. information on wireless communication devices registered therein to the serving GPRS support node SGSN.

Of the existing frequency range for radio connections, only an allocated frequency band is available to the mobile communication network, and further, as shown in FIG. 1, part of this is used by the radio channel intended for communication between the base transceiver station BTS1 and the wireless communication device MS1 by means of radio communication RC1. Usually, there are several radio channels available for use by the base transceiver station BTS1 for communication between several wireless communication devices MS1 and MS3 and the base transceiver station BTS1. For example in the digital GSM system, there are 124 radio channels available, with an inter-channel frequency difference of 200 kHz.

The physical radio channel is further divided in the time domain into logical radio channels, whereby each logical radio channel is allocated its own time span in the time domain. Thanks to this arrangement, the same physical radio channel can be used in data transmission between several wireless communication devices, such as the wireless communication devices MS1 and MS3 and the base transceiver station BTS1 in FIG. 1. In digital time division multiple access (TDMA) systems of prior art, such as D-AMPS, GSM and JDC/PDC, the above-described system is used for dividing a physical radio channel in the time domain into logical radio channels. For example in the digital GSM system, the physical radio channel is divided into eight logical radio channels. Usually the logical radio channels are also further divided into traffic channels (TCH) which are used for the transmission of e.g. speech and data, and control channels which are used for the transmission of messages relating to network function and messages for maintaining the network and the radio channels. Example control channels are the Broadcast Control Channel (BCCH) and the Common Control Channel (CCCH).

Other communication systems include digital code division multiple access CDMA systems, such as the present IS-95 and future wideband code division multiple access (WCDMA) systems. In these systems the radio channels are not necessarily separated by frequency but e.g. by a so called pseudo-random code. It will be appreciated by those skilled in the art that application of the invention described in this text is not limited to any particular form of wireless communication network.

Figure 3:
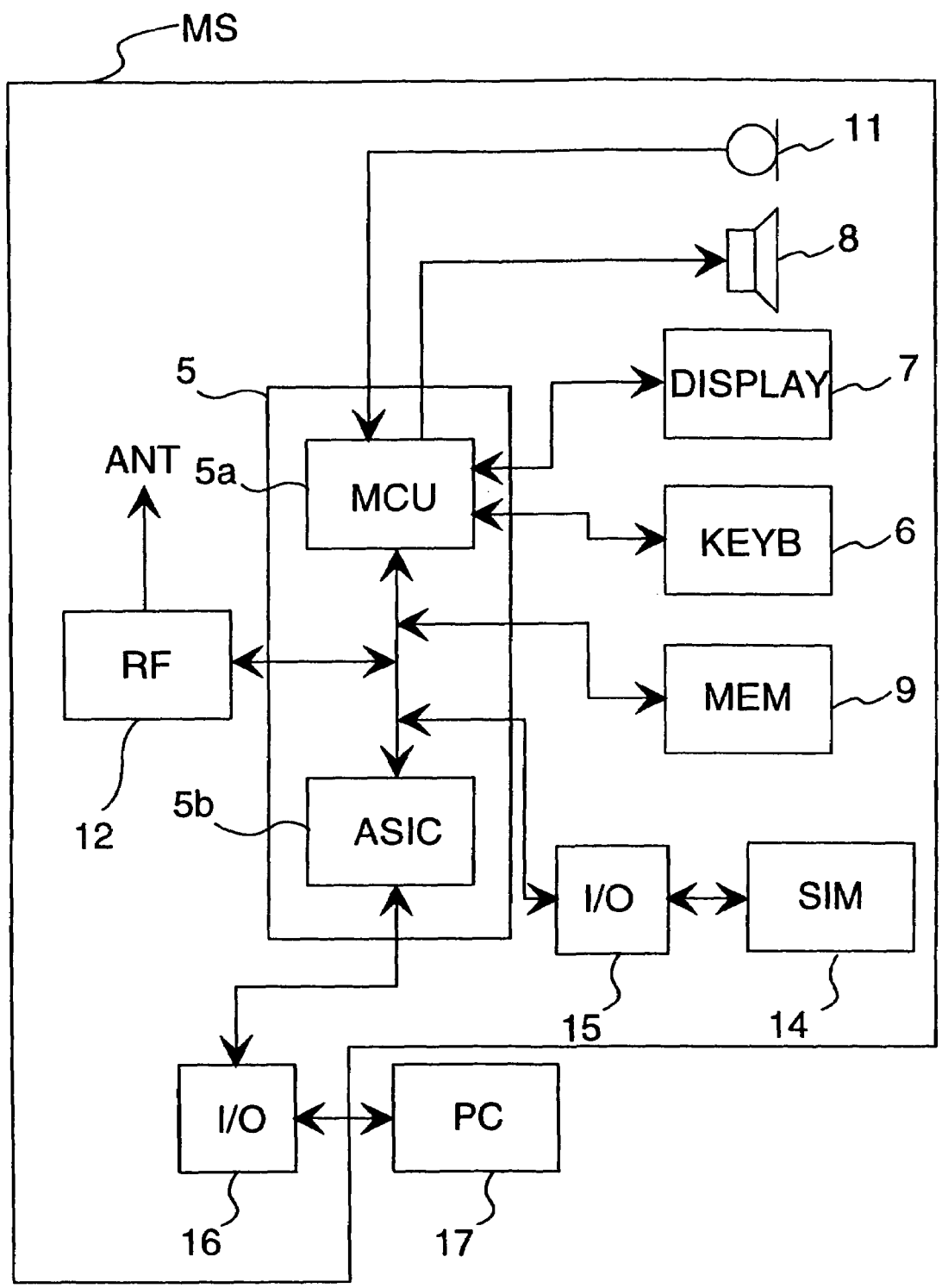
FIG. 3 is a block diagram of a wireless communication device that can be used in the mobile communication network shown in FIG. 1.

FIG. 3 is a reduced block diagram showing the wireless communication device MS available for use in the system of FIG. 1. Primarily, the block diagram shows those blocks which are important for disclosing the present invention. It is obvious that the wireless communication device of the sender, such as the wireless communication device MS1 shown in FIG. 1, and the wireless communication device of the recipient, such as the Communicator MS4 shown in FIG. 1, are not necessarily exactly similar to each other. In the block diagram of FIG. 3, the control unit 5 consists of e.g. a micro controller unit 5a (MCU) and an application specific integrated circuit 5b (ASIC). Furthermore, the wireless communication device MS contains a keypad 6, a display 7, an ear piece 8, a microphone 11, memory means 9 comprising e.g. a non-volatile read-only memory (ROM) for storing programs and system information etc. and a random access memory (RAM) for storing information during the operation of the wireless communication device MS. The wireless communication device MS also comprises a radio part 12 with the necessary means for setting up a connection, transmitting information from the wireless communication device MS to the mobile communication network and means for receiving information from the mobile communication network. FIG. 3 also shows a SIM card 14 and means 15 for connecting the SIM card to the wireless communication device MS. The wireless communication device MS, usually a mobile phone or PCMCIA radio card, can also be used in connection with a data processor 17, such as a PC device or a PDA device, as a so-called wireless modem. Thus the wireless communication device MS also comprises means 16 for connecting the data processor 17 with the wireless communication device MS. The data processor 17 is used for setting up a data transmission connection by means of the wireless communication device MS and the mobile communication network to another communication device, such as the wireless communication device MS2 or the communication device S1 formed by the modem TE1 and the computer SERVER1 in FIG. 1.

With reference to FIG. 1, for example the wireless communication devices MS1–MS4 operating in the GSM system must have at least one SIM module (subscriber identity module) containing a memory for storing subscriber-specific identification data about the mobile subscriber of the wireless communication device. This identification data includes the IMSI identification and the telephone number of the mobile subscriber. Also, messages transmitted by the short message services (SMS) of the mobile communication network can be stored in the memory of the SIM module. Moreover, the address of the visitor location register (VLR) for maintaining the information on the wireless communication device can be temporarily stored in the SIM module. By means of the subscriber-specific identification data, messages and calls from other wireless communication devices or a public land telephone network can be addressed to the correct wireless communication device. The operation of the wireless communication device is prior art to a person skilled in the art, whereby its disclosure in more detail is rendered unnecessary in this context.

The method of the present invention can be implemented in the operational software of currently available wireless communication devices. Thus, no changes are necessarily required in the hardware of the wireless communication device in order to apply the invention. The values of the parameters describing the properties of the wireless communication device can be stored in the memory means 9 of the wireless communication device MS, from which they are read, when necessary, by the operational software of the wireless communication device and transmitted to the communication network. The values of the parameters can be located in a non-volatile memory of the wireless communication device, e.g. in the ROM or RAM memory so that the information is not lost when the wireless communication device is switched off, and preferably in a way that they cannot be altered or erased by the user of the device. However, in future communication systems it may be possible to modify at least a part of the IMEI (or its equivalent). The modifiable part may include e.g. information about peripherals connected to the wireless communication device. The modification may be done by, for example, a manufacturer of a wireless communication device, or by a service person, when the user wants to update e.g. the software of the device. The modification of the IMEI may also be allowed by a sales person or by the user when, for example, the user wants to connect some peripherals to the device. Application of the method may also require changes in the communication network, for example in the operational software of the mobile services switching centre.

In the following, the application of the method of the invention will be described in detail in mobile communication networks complying with the GSM and the GSM GPRS standards, but it will be appreciated by a person skilled in the art that the method can also be applied in other mobile communication networks based on a cellular network within the scope of the claims and in particular in future networks such as the UMTS Universal Mobile Telephone System.

Properties of the receiving wireless communication device, such as a mobile phone, Communicator or multimedia communication device, affecting the use of abovementioned multimedia services include for example, the following information about:

the mobile networks supported (such as various GSM networks, UMTS),
the supported mobile network versions (e.g. UMTS/GPRS phase),
supported bearer services,
supported data transfer protocols,
possible support for external application execution environment (MExE classmark),
SIM Application Toolkit Class,
display attributes (e.g. resolution, colour/bw, number of colours/gray scales),
image coding methods supported by the communication device, and their parameters,
audio coding methods (codec) supported by the communication device, and their parameters,
service-specific data transmission rate(s),
service-specific data transmission mode(s) (e.g. SMS, HSCSD, GPRS),
maximum data transmission rate of the data transmission mode(s),
maximum allowable size of graphic files,
properties of the keypad of the wireless communication device,
properties of the control device (e.g. mouse, pointer ball, joystick) of the wireless communication device,
peripherals of the wireless communication device, and Internet presentation modes (e.g. Java, HTML versions) supported by the wireless communication device.

In addition, the properties of the receiving wireless communication device can also include user preferences, for example information about:
- the preferred audio/video codec,
- the preferred character set (e.g. cyrillic or western/latin fonts),
- the language preferences (e.g. primary and secondary language), and
- the preferred input device.

When a wireless communication device MS1 is switched on, it advantageously attempts to make contact with a mobile communication network PLMN, e.g. a GSM cellular network. The particular mobile communication network PLMN to be contacted may be selected either automatically or manually. The wireless communication device MS1 looks for a suitable cell of the chosen mobile communication network PLMN and chooses that cell to provide available services, and tunes to its control channel (e.g. BCCH and CCCH in GSM cellular network). This selection process is known as "camping on the cell". The wireless communication device MS1 then registers its presence in the location area (LA) of the chosen cell if necessary, by means of a location update (LU) or IMSI attach procedure. If the wireless communication device MS1 loses coverage of a cell, it hands over to the most suitable alternative cell of the selected mobile communication network PLMN and starts to use that cell. If the new cell is in a different location area, a location update request is performed. If the wireless communication device MS1 loses coverage of a mobile communication network PLMN, either a new mobile communication network is selected automatically, or an indication of which mobile communication networks are available is given to the user, so that manual selection can be made.

When the wireless communication device MS1 is registered to a mobile communication network PLMN, it is able to receive system information from the mobile communication network PLMN via the base transceiver station BTS1, BTS2, BTS3 of the cell in question. If the wireless communication device MS1 wishes to initiate a call, it can do this by initially accessing the network on the control channel of the cell on which it is camped. If the mobile communication network PLMN receives a call for the wireless communication device MS1, it knows (in most cases) the location area of the cell in which the wireless communication device MS1 is camped. It can then send a "paging" message for the wireless communication device MS1 on control channels of all the cells in the location area. The wireless communication device MS1 will then receive the paging message because it is tuned to the control channel of a cell in that location area, and the wireless communication device MS1 can respond on that control channel.

Figure 4:
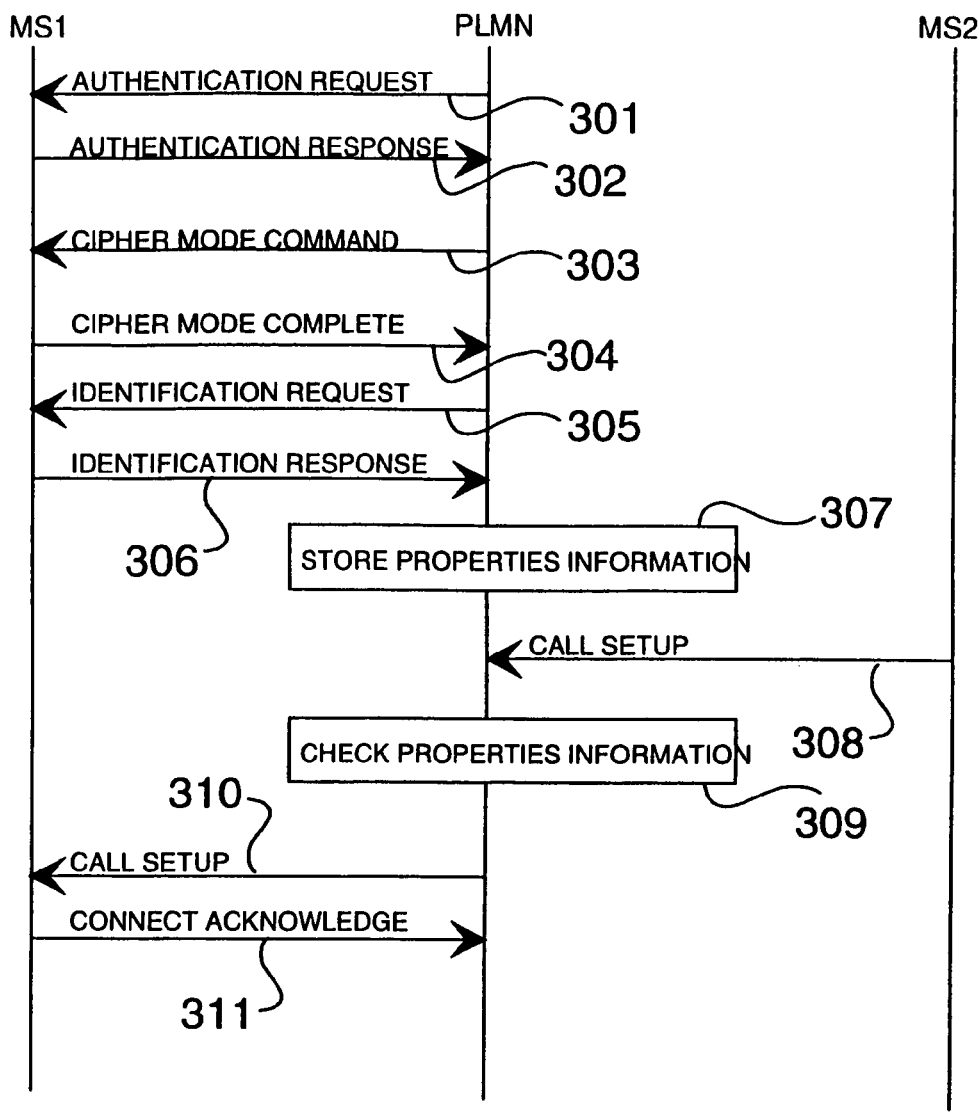
FIG. 4 illustrates the transmission of parameter data describing the properties of a communication device during registration to the communication network, using an advantageous embodiment of the method of the invention.

During the registration procedure the wireless communication device and the mobile communication network carry out signalling to exchange information, such as the identification information of the wireless communication equipment, information about the ciphering mode, etc. In the present invention there is provided a new and more comprehensive way to exchange information about properties of the wireless communication equipment than in prior art systems. FIG. 4 shows an exemplified diagram of the messages exchanged during the registration procedure according to an advantageous embodiment of the present invention. The mobile communication network PLMN sends an authentication request message 301 to the wireless communication device MS1. The authentication request message 301 contains e.g. the parameters necessary to calculate the authentication response parameters. It also contains a ciphering key sequence number allocated to the ciphering key. The wireless communication device MS1 processes the received information and responds to the authentication request message by sending an authentication response message 302 to the base tranceiver station BTS1 with which the wireless communication device MS1 is in communication. The information included in the authentication response message is forwarded to the mobile services switching centre MSC1 of the mobile communication network PLMN, where the information is handled.

After the wireless communication device MS1 is authorized, the mobile communication network PLMN sends a cipher mode command 303 to the wireless communication device MS1. The cipher mode command is used inter alia to inform the wireless communication device MS1 if ciphering of information (encryption) is available in the mobile communication network PLMN. If ciphering is available, the wireless communication device MS1 sets some security parameters for ciphering and begins to send information in enciphered format. Then the wireless communication device MS1 sends a cipher mode complete message 304 to the mobile communication network PLMN.

After the mobile communication network PLMN has received the cipher mode complete message from the wireless communication device MS1, it performs an identification procedure. The identification procedure is used by the mobile communication network PLMN to request certain specific identification parameters, e.g. International Mobile Subscriber Identity and International Mobile Station Equipment Identity. The mobile communication network PLMN sends an identification request message 305 to the wireless communication device MS1. The identification request message 305 specifies the requested identification parameters (e.g. IMSI and IMEI) in an identity type information element. Upon receipt of the identity request message the wireless communication device MS1 sends back an identity response message 306. The exact form of the messages used can vary according to the kind of the system.

Figure 5:
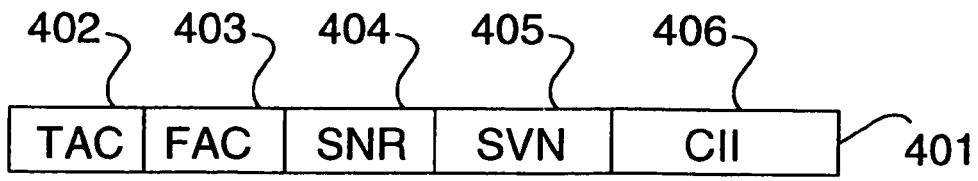
FIG. 5 is an advantageous embodiment of an information frame to be used to transmit parameter data describing the properties of a wireless communication device.

The identity response message 306 contains the identification parameters as requested by the mobile communication network PLMN. In the preferred embodiment of the present invention the identity response message 306 also contains the information about the properties of the wireless communication device MS1 additional to that provided according to prior art. In this embodiment this information is included in a ME-frame 401 (Mobile Equipment). In the preferred embodiment of the present invention the ME-frame 401 provides all the information of the prior art IMEI, but includes an additional data field: a Capability Information Indicator (CII) field 406. FIG. 5 presents an advantageous example of the ME-frame 401, which includes a Type Approval Code (TAC) field 402, a Final Assembly Code (FAC) field 403, a Serial Number (SNR) field 404, a Software Version Number (SVR) field 405 and the CII field 406. The SVR field 405 contains information about the software version of the wireless communication device MS1. This software version information can be used to some extent to evaluate the properties of the wireless communication device MS1. However, there are many properties which are not necessarily dependent on the software, e.g. the resolution of the display, properties of the keypad, properties of the control device, maximum data transmission rate, etc. The CII field may also include additional information about the software as well as information about peripherals shipped as standard with the communication device. It is therefore intended that this additional information should be advantageously included in the CII field 406 of the ME-frame 401.

The IMEI is stored on the wireless communication device MS1. Therefore, the properties information included in the CII field 406 is not affected by the SIM module inserted in the wireless communication device MS1. Advantageously (and, as is specified in existing standards), the IMEI cannot be modified by the user.

The CII field 406 contains information about the properties of the wireless communication device MS1 and may also have subfields for each of the properties. In this example there are 17 different properties and 4 types of preference information as described above, but it is apparent that in practical applications the number of properties may vary and that other properties may also be included in the CII field 406. The CII field length can be either fixed or variable. In the latter case end-of-field or length-of-field information is included in the CII field 406 or in the ME frame 401, which is known as such. There are many possible ways to express the property information in the CII field 406. For example, the information about the supported mobile networks can be a binary sequence where every bit is reserved for a certain type of mobile network (GSM, UMTS, DAMPS, etc). The logical 1 state of a bit expresses advantageously that the property in question is supported and the logical 0 state of a bit expresses advantageously that the property in question is not supported, respectively. Some of the properties may also be expressed as ASCII strings. For example, if the wireless communication device MS1 comprises a colour display, the resolution of which is 480×640 with 256 colours, information about display attributes can be expressed as a string "480×640,C,256". In this case another alternative is to define a binary sequence, wherein a part of the bits are reserved for information about the display size, another part is reserved for colour/bw information and another part is reserved for information about the number of colours/levels of gray, etc.

In the mobile communication network PLMN the identification response message 306 is examined and the property information is stored (block 307 in FIG. 4) in the mobile communication network PLMN, advantageously in that mobile services switching centre MSC1 which is serving the wireless communication device MS1.

At this stage the mobile communication network PLMN is aware of the properties of the wireless communication device MS1. When there is a call coming to the wireless communication device MS1, the mobile communication network PLMN may now check, if the wireless communication device MS1 is able to receive and handle that call. For example, the call might be a video call from another wireless communication device MS2. This situation is presented as an arrow 308 in FIG. 4. When there is a call coming to the wireless communication device MS1 (Mobile terminated call) from e.g. a telephone of the PSTN network or another wireless communication device MS2, the operator of the telephone network transmits e.g. the number of the addressee's wireless communication device MS1 to the mobile services switching centre. The mobile services switching centre retrieves the rights of the mobile subscriber in question from the home location register HLR and the visitor location register VLR. After this, the mobile communication network PLMN checks the property information of the wireless communication device MS1 to find out if the call can be set up. In the above mentioned video call situation, the mobile communication network PLMN determines whether the addressee's wireless communication device MS1 comprises means for receiving and displaying video information. If the addressee's wireless communication device MS1 comprises such means the video call can be set up, otherwise the call is not set up and the caller is advantageously informed of that. If the call can be set up, the mobile communication network PLMN and the wireless communication device MS1 transmit control and identification data required for call set-up.

The addressee's wireless communication device MS1 and the caller's wireless communication device MS2 do not necessarily have the same kind of video properties. For example, the resolution and/or the number of colours/gray scales may be different in wireless communication devices MS1, MS2. In such a case the mobile communication network PLMN and/or the caller's wireless communication device MS2 may comprise means to convert transmitted video information into a format suitable for the receiving wireless communication device MS1, MS2. During the call set-up, the mobile communication network PLMN preferably checks if the conversion of video signal is needed and if the quality of the converted signal will be sufficiently good. It the conversion reduces the quality of the video signal too much, the call is preferably not set up at all.

Advantageously the mobile communication network PLMN can use the property information to optimize the communication connection according to the type of call and according to the information to be transmitted. For example, the mobile communication network PLMN can select appropriate communication parameters for a data call according to the supported data rates of the wireless communication device MS1. The property information can also be used to select an appropriate bearer service or services for each call. These optimization and selection processes require significantly less signalling compared to prior art systems during the call set-up phase, because the required information is already available in the mobile communication network PLMN.

The mobile communication network PLMN may request the property information from the wireless communication device MS1 substantially any time while the wireless communication device MS1 is in communication with the mobile communication network PLMN, including handover. The purpose of the handover is to ensure that the connection to the wireless communication device MS1 is maintained as it moves from one base station system BSS area to another. Handover can take place between base stations BTS1, BTS2, BTS3 connected to the same mobile switching centre MSC1 (Intra-MSC handover), or between base stations connected to different mobile switching centres MSC1, MSC2 (Inter-MSC handover).

In a situation where the other party of the call is e.g. a communication device S1, S2 of a service provider, the property information of the wireless communication device MS1 is advantageously transmitted to the communication device S1, S2. Alternatively, the communication device S1, S2 may contact the mobile communication network PLMN to obtain the property information of the wireless communication device MS1. The property information can then be used to optimize the data transmission during the call. The mobile services switching centre transmits a message consisting of the parameters describing the properties of the wireless communication device MS1 to the communication device S1, S2, which also acknowledges the receipt of this data. For this purpose, a protocol selection, such as IP or X.25, is made between the mobile services switching centre and the communication device. It is obvious that the messages used for transmitting the parameters and the acknowledgements on the receipt of the messages can vary in their content depending on whether the messages are transmitted between the wireless communication device and the mobile services switching centre or between the mobile services switching centre and the communication device. On the basis of the received data, the server of the communication device S1, S2 optimises the data to be transmitted to correspond to the properties of the wireless communication device MS1, after which optimised data transmission can be initiated. According to the invention, optimisation of the properties of the radio link can also be performed on the basis of the properties detailed in the IMEI i.e. preferences for data transmission modes. The communication device S1, S2 is advantageously coupled directly with the mobile services switching centre of the mobile communication network PLMN. Preferably data transmission takes place using a radio connection between the wireless communication device MS1 and the mobile services switching centre. However, the method can also be easily implemented in other mobile communication networks, such as the D-AMPS and JDC/PDC cellular networks.

By using the parameter data provided from the mobile communication device MS1, it is possible to optimise any incoming information for use of the terminal, and/or to optimise the transmission of the information between the communication network and the mobile communication device MS1.

In order to optimise data transmission from a server, for example a high resolution graphics file may be reduced to a lower resolution that can be displayed on the display of a particular wireless communication device MS1. Thus, when transmitting a graphics file, it is also possible to convert the original coding of the image, e.g. GIF, JPEG or TIFF, into another type of coding, whereby the data transmission connection is used as efficiently as possible. The contents of the graphics file may then be reproduced by the display device of the destination communication device MS1, or the coding can be interpreted by the communication device with its application software. It is often possible to reduce the resolution of an image without hampering the interpretation of the information in the image or significantly reducing image quality. By selection of the coding, it is also possible to affect the graphics file to be transmitted, whereby smaller files can be transmitted faster. In another example, the transmission rate, as well as the resolution, of a video image stored in the server can be adapted to better correspond e.g. to the reproduction capacity of the wireless communication device or to the capacity of the data transmission connection, e.g. a radio connection. This can take place for example by re-coding and pre-processing of the video image to be transmitted. This can also be conducted in connection with transmission of a real-time video image, such as a video conference. Thus, the video image to be transmitted is re-coded to suit the radio transmission channel used in communication, for example the HSCSD service or the GSM GPRS network. In a further example, the server can take into account the properties of the input means of the receiving communication device, such as the properties of the keypad and the properties of the control device, for example a mouse, joy-stick or pointer ball, or their possible lack in the device. Thus a form to be transmitted, such as an Internet page or a page of a spreadsheet (computation software) that must be completed by the user of the wireless communication device MS1 or requires input from the user of the wireless communication device MS1, can be transmitted to the device in a suitable form. Also, the properties of the receiving device can be taken into account e.g. in a case that the device only supports a certain presentation protocol, such as a particular HTML version. It is particularly important to take into account the properties of the device when loadable program codes such as Java script are used.

A fundamental purpose of registering the wireless communication device in a mobile communication network, such as the GSM GPRS network, is to determine the location of the wireless communication device in the mobile communication network PLMN by means of the identification data, such as the IMSI and IMEI identification. This is necessary for correct routing of the data packets addressed to the wireless communication device, for example for addressing PDU data packets from a PDN network to a GPRS serving GPRS support node SGSN serving the wireless communication device. In connection with registration, the network can also be informed of the rights and properties of the wireless communication device MS1 as described above.

The mobile services switching centre MSC1, MSC2 maintains information on the wireless communication devices registered in it, such as their IMSI identifications. According to another advantageous embodiment of the method of the invention, the mobile services switching centre MSC1 requests the information describing the properties of the wireless communication device MS1 e.g. when the wireless communication device is registered in the mobile services switching centre and then the property information is stored in the mobile services switching centre MSC1, for example in the home location register HLR or in the visitor location register VLR. In connection with a mobile-originated call, the mobile services switching centre retrieves this data from its registers and transmits it to the server S1, S2 offering multimedia services. Thus, the wireless communication device does not need to transmit its property information to the mobile services switching centre in connection with each call. If necessary, the mobile services switching centre asks the wireless communication device for its property information.

In accordance with another advantageous embodiment of the invention, the above-mentioned property information can also be transmitted from the mobile services switching centre MSC1, MSC2 to the server S1, S2 upon a mobile-terminated call. Thus, the server offering multimedia services contacts the mobile services switching centre MSC1, MSC2 for setting up a data transmission connection with the wireless communication device, relating to e.g. a service ordered earlier by the mobile subscriber. In the mobile services switching centre MSC1, MSC2 in question, the property information of the wireless communication device is stored, and this property information is transmitted to the server S1, S2.

The above-mentioned advantageous embodiments of the invention have the advantage that data transmission between the wireless communication device and the mobile services switching centre is reduced. When the serving GPRS support node is also in communication with the mobile services switching centre, the property information can be retrieved from there. In addition to the mobile services switching centre, the property information can also be stored in the GPRS register of the serving GPRS support node.

According to the example described above, and with reference to FIG. 1, the transmitting communication device used is a communication device S4 comprising a telecommunication terminal TE4 and a data processor GS1. This communication device S4 can also be used as a gateway server S4, wherein, according to FIG. 1, for example the communication device S2 communicates via this communication device S4 with the communication network PDN. Naturally, it is possible that the communication device S2 communicates with the PDN network only via this gateway server S4 for routing multimedia information into the communication network, such as the PDN network and further to the subscriber. Thus, the server S4 can also be used as a filtering proxy in the communication network, whereby the filtering proxy, on the basis of subscriber data, filters multimedia information to be transmitted from the communication device S2 in a way that information comprising content material of a selected type is filtered out, or that its transmission in the communication network is totally prevented. Moreover, it should be obvious to someone of ordinary skill in the art that e.g. operation according to this example is also possible with communication devices communicating with the PSTN network.

It is obvious to a person skilled in the art that the invention is not limited solely to the examples presented above but the embodiments of the invention can vary within the scope of the claims below.

What is claimed is:

1. A method for storing and informing at least one property of a wireless communication device to a mobile communication network, the method comprising:
    defining an International Mobile Station Equipment Identity for the wireless communication device, the International Mobile Station Equipment Identity comprising a non-modifiable part and a modifiable part and being arranged to store both information for identifying the wireless communication device to the mobile communication network and information relating to at least one property of the wireless communication device;
    storing at least part of said information relating to at least one property of the wireless communication device in said modifiable part of the International Mobile Station Equipment Identity; and
    storing the International Mobile Station Equipment Identity in a memory of the wireless communication device.

2. The method according to claim 1, comprising transmitting said information relating to at least one property of the wireless communication device from the wireless communication device to the mobile communication network in connection with registration of the wireless communication device to the mobile communication network.

3. The method according to claim 1, comprising transmitting said information relating to at least one property of the wireless communication device from the wireless communication device to the mobile communication network prior to a call being set-up with the wireless communication device.

4. The method according to claim 3, wherein the information relating to at least one property of the wireless communication device is checked in the mobile communication network during call set-up with the wireless communication device to determine if the wireless communication device is able to receive and handle the call.

5. The method according to claim 1, comprising transmitting said information relating to at least one property of the wireless communication device from the wireless communication device to the mobile communication network in connection with a handover.

6. The method according to claim 1, comprising transmitting the information relating to at least one property of the wireless communication device to a mobile services switching center of the mobile communication network, or a serving GPRS support node.

7. The method according to claim 1, wherein the International Mobile Station Equipment Identity comprises at least one field for storing the information relating to at least one property of the wireless communication device, and the length of said field is fixed.

8. The method according to claim 1, wherein the International Mobile Station Equipment Identity comprises at least one field for storing the information relating to at least one property of the wireless communication device, and the length of said field is variable.

9. The method according to claim 1, comprising storing the International Mobile Station Equipment Identity in the memory of the wireless communication device in connection with manufacturing of the wireless communication device.

10. The method according to claim 1, comprising updating the International Mobile Station Equipment Identity in connection with a change in the properties of the wireless communication device or when a peripheral device is connected to the wireless communication device.

11. The method according to claim 1, comprising transmitting the information relating to at least one property of the wireless communication device from the wireless communication device to the mobile communication network and storing it in a mobile services switching center of the mobile communication network.

12. The method according to claim 1, comprising transmitting the information relating to at least one property of the wireless communication device from the wireless communication device to the mobile communication network.

13. The method according to claim 12, further comprising establishing a call for transmitting information from another communication device to said wireless communication device, wherein the information to be transmitted from said other communication device is optimized for use by the wireless communication device in the mobile communication network by using the information relating to at least one property of the wireless communication device transmitted from the wireless communication device to the mobile communication network.

14. The method according to claim 13, wherein the information to be transmitted is converted in the mobile communication network into a format suitable for the wireless communication device.

15. The method according to claim 12, further comprising performing communication between the mobile communication network and another communication device, wherein information relating to at least one property of the wireless communication device is transmitted to said other communication device.

16. The method according to claim 15, further comprising establishing a call for transmitting information from said other communication device to the wireless communication device, wherein said other communication device optimizes the information to be transmitted to correspond with the properties of the wireless communication device by using the information relating to at least one property of the wireless communication device transmitted to said other communication device.

17. The method according to claim 16, wherein the information to be transmitted is converted in said other communication device into a format suitable for the wireless communication device.

18. The method according to claim 15, wherein said other communication device is located in a communication network other than the mobile communication network.

19. The method according to claim 12, further comprising performing communication between the mobile communication network and another communication network, wherein information relating to at least one property of the wireless communication device is transmitted to said other communication network.

20. The method according to claim 19, further comprising establishing a call for transmitting information to the wireless communication device from a communication device in said other communication network, wherein the information to be transmitted from said communication device in the other communication network is optimized for use by the wireless communication device by using the information relating to at least one property of the wireless communication device transmitted to said other communication network.

21. The method according to claim 12, further comprising establishing a call for transmitting information from another communication device to said wireless communication device, wherein the mobile communication network optimizes a communication connection for the call by using the information relating to at least one property of the wireless communication device transmitted from the wireless communication device to the mobile communication network.

22. The method according to claim 1, wherein the wireless communication device comprises a mobile phone.

23. The method according to claim 1, wherein the wireless communication device has the combined properties of a cellular mobile telephone and a personal digital assistant.

24. The method according to claim 1, wherein the wireless communication device comprises a radio card.

25. The method according to claim 1, wherein the information relating to at least one property of the wireless communication device contains information about at least one hardware property of the wireless communication device.

26. The method according to claim 1, wherein the information relating to at least one property of the wireless communication device contains information about at least one software property of the wireless communication device.

27. The method according to claim 1, wherein the information relating to at least one property of the wireless communication device contains information about at least one preference of a user of the wireless communication device.

28. The method according to claim 1, wherein modification of the information relating to at least one property of the wireless communication device by a user of the wireless communication device is prevented.

29. The method according to claim 1, wherein the International Mobile Station Equipment Identity is further arranged to store information about peripheral devices connected to the wireless communication device.

30. The method according to claim 1, wherein the information for identifying the wireless communication device to the mobile communication network stored in the International Mobile Station Equipment Identity is in the form of number series.

31. The method according to claim 1, wherein the International Mobile Station Equipment Identity is modifiable by one of a group comprising: a manufacturer of the wireless communication device, a service person, a sales person, or a user of the wireless communication device.

32. A method of manufacturing a wireless communication device, the method comprising:

defining an International Mobile Station Equipment Identity for the wireless communication device, the International Mobile Station Equipment Identity comprising a non-modifiable part and a modifiable part and being arranged to store both information for identifying the wireless communication device to a mobile communication network and information relating to at least one property of the wireless communication device;

storing at least part of said information relating to at least one property of the wireless communication device in said modifiable part of the International Mobile Station Equipment Identity; and storing the International Mobile Station Equipment Identity in a memory of the wireless communication device.

33. The method according to claim 32, wherein the information for identifying the wireless communication device to the mobile communication network stored in the International Mobile Station Equipment Identity is in the form of number series.

34. A wireless communication device comprising:

a memory;

a radio part comprising a transmitter for transmitting information to a mobile communication network and a receiver for receiving information from the mobile communication network;

wherein the wireless communication device further comprises an International Mobile Station Equipment Identity defined for the wireless communication device and stored in the memory of the wireless communication device, the International Mobile Station Equipment Identity comprising a non-modifiable part and a modifiable part and being arranged to store both information for identifying the wireless communication device to the mobile communication network and information relating to at least one property of the wireless communication device, at least part of said information relating to at least one property of the wireless communication device being stored in said modifiable part of the International Mobile Station Equipment Identity.

35. The wireless communication device according to claim 34, further arranged to transmit said information relating to at least one property of the wireless communication device to the mobile communication network in connection with registration of the wireless communication device to the mobile communication network.

36. The wireless communication device according to claim 34, further arranged to transmit said information relating to at least one property of the wireless communication device to the mobile communication network prior to a call being set-up with the wireless communication device.

37. The wireless communication device according to claim 34, further arranged to transmit said information relating to at least one property of the wireless communication device from the wireless communication device to the mobile communication network in connection with a handover.

38. The wireless communication device according to claim 34, wherein the International Mobile Station Equipment Identity comprises at least one field for storing the information relating to at least one property of the wireless communication device, the length of said field being fixed.

39. The wireless communication device according to claim 34, wherein the International Mobile Station Equipment Identity comprises at least one field for storing the information relating to at least one property of the wireless communication device, said field being of a variable length.

40. The wireless communication device according to claim 34, wherein the International Mobile Station Equipment Identity is stored in the memory of the wireless communication device in connection with manufacturing of the wireless communication device.

41. The wireless communication device according to claim 34, wherein the International Mobile Station Equipment Identity is updated in connection with a change in the properties of the wireless communication device or when a peripheral device is connected to the wireless communication device.

42. The wireless communication device according to claim 34, wherein the device comprises a mobile phone.

43. The wireless communication device according to claim 34, wherein the device has the combined properties of a cellular mobile telephone and a personal digital assistant.

44. The wireless communication device according to claim 34, wherein the device comprises a radio card.

45. The wireless communication device according to claim 34, further arranged to convert information to be transmitted from the wireless communication device to another wireless communication device into a format suitable for the other wireless communication device, based on information relating to at least one property of the other wireless communication device received from the other wireless communication device.

46. The wireless communication device according to claim 34, wherein the International Mobile Station Equipment Identity is further arranged to store information about peripheral devices connected to the wireless communication device.

47. The wireless communication device according to claim 34, wherein the information relating to at least one property of the wireless communication device stored in the International Mobile Station Equipment Identity contains information about at least one hardware property of the wireless communication device.

48. The wireless communication device according to claim 34, wherein the information relating to at least one property of the wireless communication device stored in the International Mobile Station Equipment Identity contains information about at least one software property of the wireless communication device.

49. The wireless communication device according to claim 34, wherein the information relating to at least one property of the wireless communication device stored in the International Mobile Station Equipment Identity contains information about at least one preference of a user of the wireless communication device.

50. The wireless communication device according to claim 34, wherein modification of the information relating to at least one property of the wireless communication device by a user of the wireless communication device is prevented.

51. The wireless communication device according to claim 34, further arranged to optimize information to be transmitted from said wireless communication device to another wireless communication device to correspond with the properties of the other wireless communication device by using information relating to at least one property of the other wireless communication device received from the other wireless communication device.

52. The wireless communication device according to claim 34, wherein the information for identifying the wireless communication device to the mobile communication network stored in the International Mobile Station Equipment Identity is in the form of number series.

53. The wireless communication device according to claim 34, wherein the International Mobile Station Equipment Identity is modifiable by one of a group comprising: a manufacturer of the wireless communication device, a service person, a sales person, or a user of the wireless communication device.

54. A wireless communication system comprising:
a mobile communication network;
a wireless communication device;
the wireless communication device comprising:
a memory;
a radio part comprising a transmitter for transmitting information to the mobile communication network and a receiver for receiving information from the mobile communication network;
wherein the wireless communication device further comprises an International Mobile Station Equipment Identity defined for the wireless communication device and stored in the memory of the wireless communication device, the International Mobile Station Equipment Identity comprising a non-modifiable part and a modifiable part and being arranged to store both information for identifying the wireless communication device to the mobile communication network and information relating to at least one property of the wireless communication device, at least part of said information relating to at least one property of the wireless communication device being stored in said modifiable part of the International Mobile Station Equipment Identity.

55. The wireless communication system according to claim 54, wherein the wireless communication device is arranged to transmit said information relating to at least one property of the wireless communication device to the mobile communication network in connection with registration of the wireless communication device to the mobile communication network.

56. The wireless communication system according to claim 54, wherein the wireless communication device is arranged to transmit said information relating to at least one property of the wireless communication device to the mobile communication network prior to a call being set-up with the mobile communication network.

57. The wireless communication system according to claim 56, wherein the mobile communication network is arranged to check said information relating to at least one property of the wireless communication device during call set-up with the wireless communication device to determine if the wireless communication device is able to receive and handle the call.

58. The wireless communication system according to claim 54, wherein the wireless communication device is arranged to transmit said information relating to at least one property of the wireless communication device to the mobile communication network in connection with a handover.

59. The wireless communication system according to claim 54, wherein the mobile communication network comprises means for storing information relating to at least one property of the wireless communication device transmitted from said wireless communication device.

60. The wireless communication system according to claim 59, comprising a mobile services switching center, wherein information relating to at least one property of the wireless communication device transmitted to the mobile communication network from the wireless communication device is stored in said mobile services switching center.

61. The wireless communication system according to claim 59, comprising a register and wherein information relating to at least one property of the wireless communication device transmitted to the mobile communication network from the wireless communication device is stored in said register.

62. The wireless communication system according to claim 54, further comprising means for communication between the mobile communication network and another communication device, and wherein the mobile communication network comprises means for transmitting information relating to at least one property of the wireless communication device to said other communication device.

63. The wireless communication system according to claim 54, further comprising means for communication between the mobile communication network and another communication network, and wherein the mobile communication network comprises means for transmitting information relating to at least one property of the wireless communication device to said other communication network.

64. The wireless communication system according to claim 54, further comprising means for establishing a call for communication between the wireless communication device and another communication device, wherein the communication is optimized by using the information relating to at least one property of the wireless communication device.

65. The wireless communication system according to claim 54, further comprising means for establishing a call for transmitting and receiving information between the wireless communication device and another communication device, and wherein the information is optimized for use by the receiving communication device, by using the information relating to at least one property of the wireless communication device.

66. The wireless communication system according to claim 54, comprising means for establishing a call for transmitting information from another communication device to said wireless communication device, wherein the mobile communication network is arranged to optimize the information to be transmitted from said other communication device for use by the wireless communication device by using the information relating to at least one property of the wireless communication device transmitted from the wireless communication device to the mobile communication network.

67. The wireless communication system according to claim 54, comprising means for establishing a call for transmitting information from another communication device to said wireless communication device, wherein the mobile communication network is arranged to optimize a communication connection for the call by using the information relating to at least one property of the wireless communication device transmitted from the wireless communication device to the mobile communication network.

68. The wireless communication system according to claim 54, comprising means for performing communication between the mobile communication network and another communication device, wherein the mobile communication network is arranged to transmit information relating to at least one property of the wireless communication device to said other communication device.

69. The wireless communication system according to claim 68, wherein said other communication device is located in a communication network other than the mobile communication network.

70. The wireless communication system according to claim 68, wherein said other communication device is arranged to convert the information to be transmitted into a format suitable for the wireless communication device.

71. The wireless communication system according to claim 68, wherein mobile communication network is arranged to convert the information to be transmitted into a format suitable for the wireless communication device.

72. The wireless communication system according to claim 68, further comprising means for establishing a call for transmitting information from said other communication device to the wireless communication device, wherein said other communication device is arranged to optimize the information to be transmitted to correspond with the properties of the wireless communication device by using the information relating to at least one property of the wireless communication device transmitted to said other communication device.

73. The wireless communication system according to claim 54, wherein the information for identifying the wireless communication device to the mobile communication network stored the International Mobile Station Equipment Identity is in the form of number series.

74. The wireless communication system according to claim 54, wherein the International Mobile Station Equipment Identity is modifiable by one of a group comprising: a manufacturer of the wireless communication device, a service person, a sales person, or a user of the wireless communication device.

75. An International Mobile Station Equipment Identity for a wireless communication device, the International Mobile Station Equipment Identity comprising a non-modifiable part and a modifiable part and being arranged to store both information for identifying the wireless communication device to a mobile communication network and information relating to at least one property of the wireless communication device, at least part of said information relating to at least one property of the wireless communication device being stored in said modifiable part of the International Mobile Station Equipment Identity.

76. The International Mobile Station Equipment Identity according to claim 75, wherein the information for identifying the wireless communication device to the mobile communication network stored in the International Mobile Station Equipment Identity is in the form of number series.

77. The International Mobile Station Equipment Identity according to claim 75, comprising at least one field for storing the information relating to at least one property of the wireless communication device, the length of said field being fixed.

78. The International Mobile Station Equipment Identity according to claim 75, comprising at least one field for storing the information relating to at least one property of the wireless communication device, said field being of a variable length.

79. The International Mobile Station Equipment Identity according to claim 75, arranged to be modifiable by one of a group comprising: a manufacturer of the wireless communication device, a service person, a sales person, or a user of the wireless communication device.

80. The International Mobile Station Equipment Identity according to claim 75, arranged to be modifiable in connection with updating of the software of the wireless communication device or connection of a peripheral device to the wireless communication device.

81. A method for storing information for identifying a wireless communication device, the method comprising:
 defining an International Mobile Station Equipment Identity for the wireless communication device, the International Mobile Station Equipment Identity comprising a non-modifiable part and a modifiable part;
 storing at least part of said information relating to at least one property of the wireless communication device in said modifiable part of the International Mobile Station Equipment Identity; and
 storing the International Mobile Station Equipment Identity in a memory of the wireless communication device.

* * * * *